United States Patent
Kroeger et al.

(10) Patent No.: US 6,798,849 B2
(45) Date of Patent: Sep. 28, 2004

(54) AM DIGITAL AUDIO BROADCASTING WITH ANALOG SIGNAL PRE-COMPENSATION

(75) Inventors: Brian William Kroeger, Sykesville, MD (US); Joseph Bertram Bronder, New Market, MD (US)

(73) Assignee: iBiquity Digital Corporation, Columbia, MD (US)

( * ) Notice: Subject to any disclaimer, the term of this patent is extended or adjusted under 35 U.S.C. 154(b) by 181 days.

(21) Appl. No.: 10/012,828

(22) Filed: Dec. 10, 2001

(65) Prior Publication Data

US 2003/0108123 A1 Jun. 12, 2003

(51) Int. Cl.[7] .............................................. H03K 9/00
(52) U.S. Cl. .................................................... 375/316
(58) Field of Search ................... 375/316, 320, 375/322, 240.21, 240.24, 240.28, 240.79; 370/208, 209, 210, 203; 348/663, 726

(56) References Cited

U.S. PATENT DOCUMENTS

| | | | |
|---|---|---|---|
| 4,967,164 A | 10/1990 | Sari | |
| 5,107,520 A | 4/1992 | Karam et al. | |
| 5,148,448 A | 9/1992 | Karam et al. | |
| 5,233,632 A * | 8/1993 | Baum et al. | 375/344 |
| 5,428,404 A * | 6/1995 | Ingram et al. | 348/726 |
| 5,479,450 A | 12/1995 | Okanoue et al. | |
| 5,588,022 A | 12/1996 | Dapper et al. | |
| 5,598,436 A | 1/1997 | Brajal et al. | |
| 5,625,640 A * | 4/1997 | Palmer et al. | 375/132 |
| 5,859,876 A | 1/1999 | Dapper et al. | |
| 5,900,778 A | 5/1999 | Stonick et al. | |
| 5,903,823 A | 5/1999 | Moriyama et al. | |
| 5,937,011 A | 8/1999 | Carney et al. | |
| 6,005,894 A | 12/1999 | Kumar | |
| 6,052,157 A * | 4/2000 | Weihs | 348/663 |
| 6,072,364 A | 6/2000 | Jeckeln et al. | |
| 6,075,813 A | 6/2000 | Chen et al. | |
| 6,104,239 A | 8/2000 | Jenkins | |
| 6,144,705 A | 11/2000 | Papadopoulos et al. | |
| 6,175,389 B1 * | 1/2001 | Felts et al. | 348/663 |
| 6,215,815 B1 | 4/2001 | Chen et al. | |
| 6,275,543 B1 | 8/2001 | Petrus et al. | |
| 6,459,457 B1 * | 10/2002 | Renner et al. | 348/668 |
| 6,567,981 B1 * | 5/2003 | Jeffrey | 725/80 |
| 2002/0101840 A1 * | 8/2002 | Davidsson et al. | 370/330 |
| 2002/0147978 A1 * | 10/2002 | Dolgonos et al. | 725/62 |
| 2003/0026201 A1 * | 2/2003 | Arnesen | 370/210 |
| 2003/0125040 A1 * | 7/2003 | Walton et al. | 455/454 |

* cited by examiner

Primary Examiner—Emmanuel Bayard
(74) Attorney, Agent, or Firm—Robert P. Lenart, Esq.; Pietragallo, Bosick & Gordon

(57) ABSTRACT

A method for pre-compensating an analog signal in a composite digital audio broadcasting signal including the analog signal and a plurality of digitally modulated sub-carrier signals, the method comprising the steps of sampling the analog signal to obtain successive blocks of samples, demodulating each of the blocks of samples to obtain a plurality of demodulator outputs, remodulating the demodulator outputs that correspond to the predetermined ones of the digitally modulated sub-carrier signals to produce an error signal, subtracting the error signal from the one of the blocks of samples to produce a pre-compensated block of samples, and combining the pre-compensated block of samples with a plurality of OFDM pulses to produce a compensated composite signal. An apparatus for performing the method is also included.

15 Claims, 3 Drawing Sheets

AM DIGITAL AUDIO BROADCASTING WITH ANALOG SIGNAL PRE-COMPENSATION

BACKGROUND OF THE INVENTION

This invention relates to radio broadcasting, and more particularly, to AM In-Band-On-Channel (IBOC) Digital Audio Broadcasting (DAB), and signal processing in AM IBOC DAB transmitters.

Digital Audio Broadcasting is a medium for providing digital-quality audio, superior to existing analog broadcasting formats. AM IBOC DAB can be transmitted in a hybrid format where the digital signal coexists with the analog modulated signal, or it can be transmitted in an all-digital format where the removal of the analog signal enables improved digital coverage with reduced interference. IBOC DAB requires no new spectral allocations because each DAB signal is simultaneously transmitted within the spectral mask of an existing AM channel allocation. IBOC promotes economy of spectrum while enabling broadcasters to supply digital quality audio to their present base of listeners.

U.S. Pat. No. 5,588,022 discloses a hybrid AM IBOC broadcasting method for simultaneously broadcasting analog and digital signals in a standard AM broadcasting channel that includes the steps of broadcasting an amplitude modulated radio frequency signal having a first frequency spectrum, wherein the amplitude modulated radio frequency signal includes a first carrier modulated by an analog program signal, and simultaneously broadcasting a plurality of digitally modulated carrier signals within a bandwidth which encompasses the first frequency spectrum, each of the digitally modulated carrier signals being modulated by a portion of a digital program signal. A first group of the digitally modulated carrier signals lie within the first frequency spectrum and are modulated in-quadrature with the first carrier signal. Second and third groups of the digitally modulated carrier signals lie outside of the first frequency spectrum and are modulated both in-phase and in-quadrature with the first carrier signal.

In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least [35 dB+1 dB/kHz] below the unmodulated analog carrier level.

U.S. Pat. No. 5,859,876 is directed to reduction of analog AM signal envelope distortion caused by multiple digitally modulated carriers in the same channel as the analog AM signal. The signal transmission system of U.S. Pat. No. 5,859,876 includes means for transmitting an amplitude modulated carrier and a plurality of digitally modulated carriers. The digital carriers are placed both above and below the frequency of the analog AM carrier. Certain digital carriers that are above the frequency of the analog AM carrier have an associated digital carrier that is at an equal frequency offset below the analog AM carrier. The data modulation placed on the upper digital carrier and its counterpart are such that the signal resulting from their addition has no component that is in-phase with the analog AM carrier. Digital carrier pairs arranged in this way are said to be complementary. This configuration delivers fidelity improvements to analog AM reception of digital broadcast signals. U.S. Pat. No. 5,859,876 mentions that an additional means of reducing envelope distortion is to predistort the signal envelope. The signal envelope is predistorted to counteract the distortion added by the digital carriers. U.S. Pat. No. 5,859,876 discloses a predistortion operation performed using analog processing, and mentions that the operation can also be performed using digital processing.

In hybrid IBOC DAB systems, the presence of the analog modulated signal also gives rise to interference with respect to the digitally modulated signals in the output of the receiver demodulator. The orthogonal frequency division multiplexed (OFDM) waveform used to transmit digital information in the hybrid system permits easy removal of the analog modulated signal effects for the complimentary sub-carriers, the sub-carriers directly beneath the AM spectrum. The construction of these sub-carriers guarantees their orthogonality with the analog modulated signal after they are demodulated and appropriately combined. The effects of the analog modulated signal on the other, non-complimentary sub-carriers, however, cannot be removed by processing in the receiver.

This invention seeks to provide a method and apparatus for reducing distortion in the digital signal transmitted by the non-complementary carriers resulting from the analog modulated carrier of an AM IBOC hybrid digital broadcasting system.

SUMMARY OF THE INVENTION

This invention provides a method for pre-compensating an analog signal in a composite digital audio broadcasting signal including the analog signal and a plurality of digitally modulated sub-carrier signals, the method comprising the steps of sampling the analog signal to obtain successive blocks of samples, demodulating each of the blocks of samples to obtain a plurality of demodulator outputs, remodulating the demodulator outputs that correspond to the predetermined ones of the digitally modulated sub-carrier signals to produce an error signal, subtracting the error signal from the one of the blocks of samples to produce a pre-compensated block of samples, and combining the pre-compensated block of samples with a plurality of OFDM pulses to produce a compensated composite signal.

Successive blocks of samples can overlap each other. The number of samples in the pre-compensated block is preferably equal to the number of samples in an OFDM symbol. To produce the demodulator outputs that correspond to non-complementary sub-carriers in the composite signal, the demodulator outputs that correspond to complementary sub-carriers can be set to zero.

The invention also includes an apparatus for pre-compensating an analog signal in a composite digital audio broadcasting signal including the analog signal and a plurality of digitally modulated sub-carrier signals, the apparatus comprising means for sampling the analog signal to obtain successive blocks of samples, means for demodulating each of the blocks of samples to obtain a plurality of demodulator outputs, means for remodulating the demodulator outputs that correspond to the predetermined ones of the digitally modulated sub-carrier signals to produce an error signal, means for subtracting the error signal from the one of the blocks of samples to produce a pre-compensated block of samples, and means for combining the pre-compensated block of samples with a plurality of OFDM pulses to produce a compensated composite signal.

DESCRIPTION OF THE INVENTION

Figure 1:
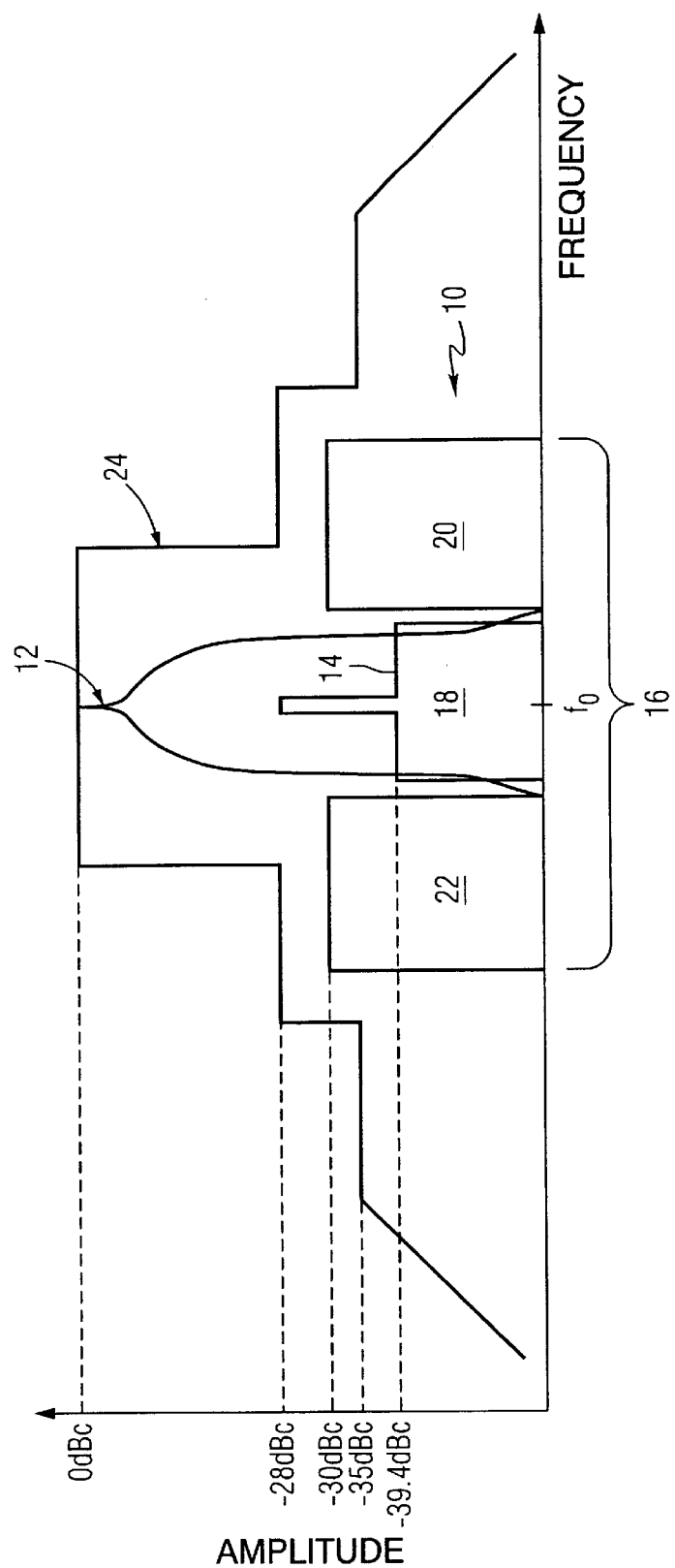
FIG. 1 is a schematic representation of an AM hybrid IBOC DAB signal, showing relative levels of the AM and DAB signals.

Referring to the drawings, FIG. 1 is a schematic representation of an AM hybrid IBOC DAB composite signal 10, showing relative levels of AM and DAB signals. The hybrid format includes the conventional AM analog signal 12 along with a DAB signal 14 transmitted beneath the AM signal. The DAB signal includes a plurality of data carriers, evenly spaced in frequency. The digitally modulated carriers are generated via orthogonal frequency division multiplexing (OFDM). This format enables the spectra of these carriers to be overlapped without any intervening guard bands, thereby optimizing spectral utilization. However, a guard interval can be used in the time domain to compensate for signal timing jitter. The OFDM modulation technique is extremely beneficial for successful DAB operation since bandwidth is a premium commodity in the AM band. An additional advantage is that there is no need to isolate the DAB digital carriers from each other via filtering in either the transmitter or receiver since the orthogonality condition of OFDM minimizes such interference.

The DAB carriers are contained within a channel 16 having a bandwidth of 30 kHz. The channel is divided into a central frequency band 18, and upper 20 and lower 22 frequency bands. The central frequency band is about 10 kHz wide and encompasses frequencies lying within ±5 kHz of the central frequency of the channel. The upper sideband extends from about +5 kHz from the central frequency to about +15 kHz from the central frequency. The lower sideband extends from about −5 kHz from the central frequency to about −15 kHz from the central frequency. The FCC emissions mask is represented by item number 24.

The composite analog and digital DAB waveform includes a plurality of modulated carriers that are fully compliant with the FCC emissions mask. A first group of the digitally modulated carriers are positioned within a frequency band illustrated by the envelope labeled 18 in FIG. 1. Most of these signals are placed 30 to 40 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary encoding (i.e. complementary BPSK, complementary QPSK, or complementary 32 QAM) more fully described U.S. Pat. No. 5,859,876.

Additional groups of quadrature amplitude modulated digital signals are placed outside the first group. The need for these digital waveforms to be in-quadrature with the analog signal is eliminated by restricting the analog AM signal bandwidth. U.S. Pat. No. 5,588,022 discloses additional information relating to IBOC DAB waveforms and is hereby incorporated by reference.

Figure 2:
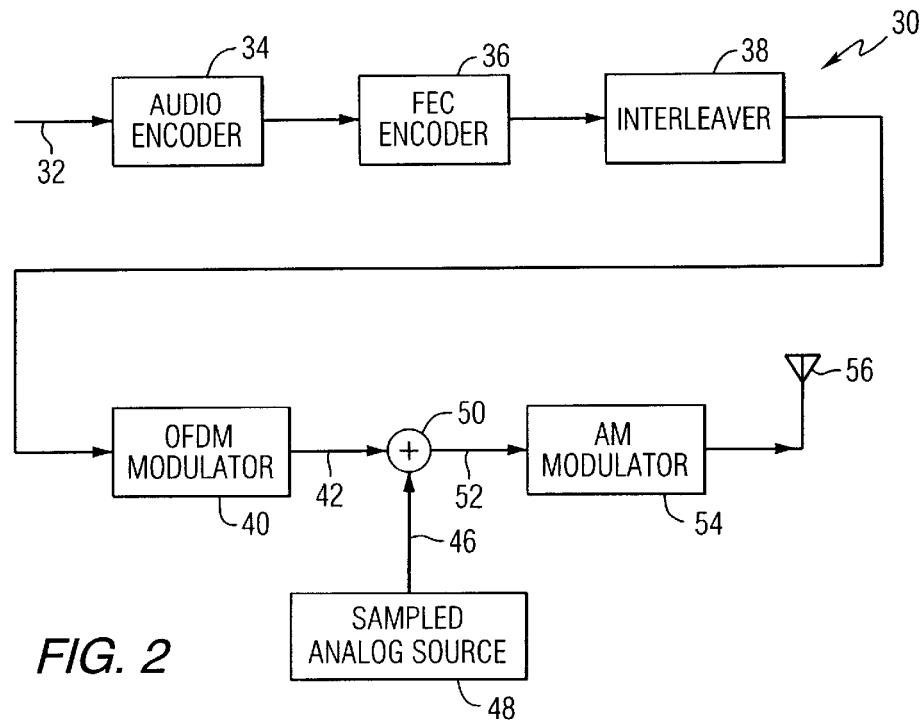
FIG. 2 is a simplified block diagram of relevant portions of an IBOC DAB transmitter which may incorporate the predistortion method of the present invention.

FIG. 2 is a block diagram of a portion of an AM IBOC DAB transmitter 30 showing the signal processing functions that are relevant to this invention. A sampled audio signal is received on line 32. An audio encoder 34 converts the sampled audio into a digital signal. This digital signal is subjected to forward error correction as illustrated in FEC encoder block 36. The FEC signal is interleaved as shown by interleaver block 38. The resulting interleaved signal is modulated by a Fast Fourier Transform modulator 40 to produce the DAB signal on line 42. To produce the sampled analog signal on line 46, a sampled audio signal is supplied by source 48. The sampled analog signal on line 46 and the digital signal on line 42 are combined in summation point 50 to produce the composite signal on line 52, that is subsequently passed to an AM modulator 54 and ultimately delivered to antenna 56. The signal transmitted by the antenna has the general form shown by the waveform of FIG. 1. While the various functions are shown in distinct blocks in FIG. 2, it should be apparent that multiple functions can be performed in the same processor or that several processors can perform a single function.

In hybrid IBOC DAB systems, the presence of the analog modulated signal also gives rise to interference with respect to the digitally modulated signals in the output of the receiver demodulator. The orthogonal frequency division multiplexed (OFDM) waveform used to transmit digital information in the hybrid system permits easy removal of the analog modulated signal effects for the complimentary sub-carriers, that is, the sub-carriers directly beneath the AM spectrum. The construction of these sub-carriers guarantees their orthogonality with the analog modulated signal after they are demodulated and appropriately combined. The effects of the analog modulated signal on the other, non-complimentary sub-carriers, however, cannot be removed by processing in the receiver.

This invention uses the sampled analog signal to produce an error signal that can be used to compensate for distortion of the digital signal carried by the non-complementary carriers that would occur at the receiver demodulator.

Figure 3:
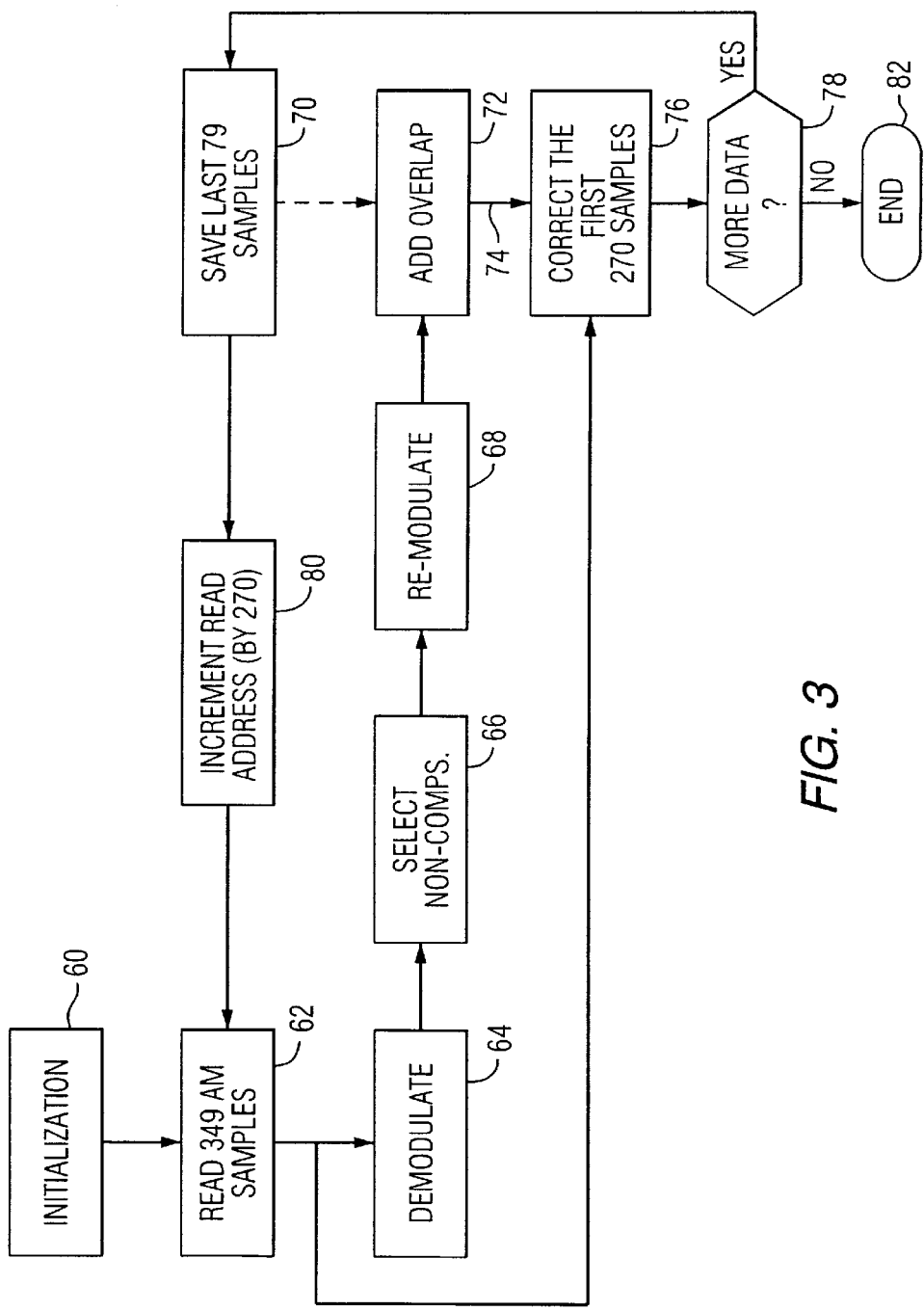
FIG. 3 is functional block diagram that illustrates the operation of the present invention.

FIG. 3 is functional block diagram that illustrates the operation of the present invention. To begin the process, an audio signal is sampled to produce a plurality of signal samples, as illustrated in block 60. The samples are digital signals representing voltage levels. A predetermined number of the samples is read to form a first sample block, as shown in block 62. In the example set forth in FIG. 3, the predetermined number of samples in each sample block is 349. However, it should be recognized that for this invention, the only restriction on the number of samples is that the number equal the number of samples that enter into the OFDM demodulation process. This is the length in samples of the OFDM window function.

The 349 sample blocks are synchronized with the OFDM pulses. In the AM IBOC DAB, each execution of the OFDM modulator produces 349 samples. Each sample is the sum of complex sinusoids the frequencies of which correspond to the sub-carriers that make up the OFDM signal. Over this set of samples, the starting phase of each sinusoid remains constant. The sums are weighted with a window function. Prior to the application of this window function, the amplitude of each complex sinusoid is constant. These sets of samples constitute the pulses that make up the OFDM signal. Since the modulator is executed once for every 270 samples, the sets of 349 samples are overlapped to form the OFDM waveform. Each sample block is demodulated as shown in block 64. Each time that the demodulator is invoked, it produces a sequence of complex values. Block 66 shows that the samples which correspond to the non-complimentary sub-carriers are selected and those samples are subsequently remodulated as shown in block 68. Block 70 shows that the last 79 samples from the previously corrected sample block have been stored. These last 79 samples are added to the remodulated signals as shown in block 72. This produces an error signal at line 74. For the case that the OFDM window function exceeds the OFDM symbol period, (as in the AM IBOC DAB) the error terms overlap in the sense that the error terms for one set of 349 samples overlap the error terms for the next or the preceding 349 samples. But the invention does not require that the pulses overlap. The error signal is then subtracted from the AM signal and the corrected 270 samples are combined with the OFDM pulses as shown in block 76. Block 78 shows that if more data is available, the last 79 samples are saved and the read address is incremented by 270 as shown in block 80, and the process illustrated in FIG. 3 is repeated until more data is not available and block 82 is reached.

Figure 4:
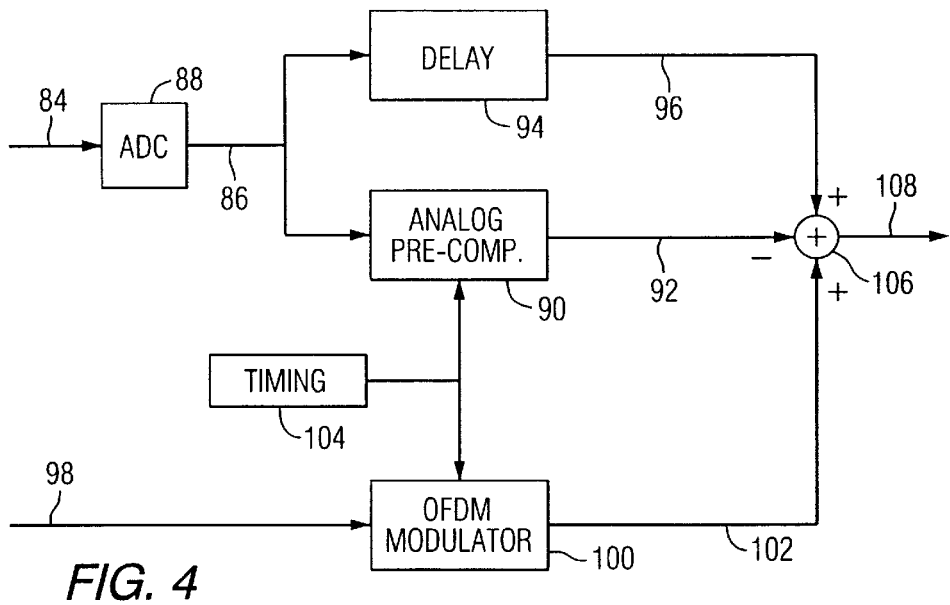
FIG. 4 is functional block diagram that further illustrates the operation of the present invention.

The error signal is subtracted from either the digitized AM (i.e. audio) signal or the OFDM signal. It is crucial that the error pulses be synchronized with both the OFDM and the digitized AM. FIG. 4 is a block diagram that illustrates how the analog pre-compensation fits in with some of the other processing in a DAB transmitter. In FIG. 4, the baseband amplitude modulated signal is received on line 84 and converted to a digital signal on line 86 by analog-to-digital converter 88. The signal on line 86 is then subjected to the analog precompensation in accordance with the process shown in FIG. 3, as illustrated in FIG. 4 in block 90. This produces an error signal on line 92. A delay element 94 is used to produce a delayed digitized baseband signal on line 96.

The digital information is received on line 98 and modulated by OFDM modulator 100 to produce the OFDM pulses on line 102. Timing block 104 is included to indicate that the analog pre-comp pulses are synchronized with the OFDM pulses. The delay block 94 is included to align the error signal with the digitized baseband AM. The error signal on line 92 is subtracted from the delayed digitized baseband signal and the OFDM pulses in summation point 106 to produce a compensated composite signal on line 108, that is then up-converted for broadcast.

Returning to FIG. 3, the re-modulation process is OFDM modulation. The re modulation produces a total of 349 samples. The last 79 samples of the re-modulator output from the previous pulse are added to the first 79 samples of the re-modulator for the current pulse. The 79 combined samples together with the next 191 samples of the current re-modulator output are then subtracted from the first 270 samples of the current block of 349 AM samples. The remaining 79 samples of the re-modulator output are saved for the processing of the next block of AM samples.

Overlapped blocks of the AM sampled signal form the input to the processing illustrated in FIG. 3. These blocks are 349 samples long with 79 samples of overlap, that is, the first 79 samples of any block are the same as the last 79 samples of the previous block. The processing outputs non-overlapped, contiguous blocks of pre-compensated AM data. Each block consists of 270 samples.

In one embodiment of the invention, the host AM signal can be sampled at 59535000/1280=1488375/32 kHz. The number of samples in the demodulator input is 349 and the OFDM symbols period in samples is 270. The output comprises the sum of the AM and the negative of an error signal in blocks of 270 samples in synchrony with the OFDM pulses.

The demodulation output for the n-th block of AM samples is:

$$A(m;n) = \exp\left(-2\cdot\pi\cdot j\cdot\frac{82\cdot(m-1)}{N}\right)$$

$$\sum_{k=1}^{349} w(k)\cdot a^{(0)}(270\cdot n+k)\cdot \exp\left(-2\cdot\pi\cdot j\cdot\frac{(m-1)\cdot(k-1)}{N}\right),$$

$$\text{for } m=1,2,...,N$$

where $a^{(0)}(k)$ denotes the sequence of AM samples and N=256 is the ratio of the AM sample rate to the OFDM sub-carrier spacing. Here, n is the pulse number, m is the sample number within the pulse, w is the window function, and k is a summation index.

To select the samples corresponding to the non-complementary carriers, the samples corresponding to the complimentary carriers are set to zero:

$$A(m;n) \Leftarrow 0, \begin{cases} m=2,3,...,53 \\ m=205,206,...,256 \end{cases}$$

Error terms for the non-complimentary sub-carriers are generated according to the following equation:

$$\delta(k;n) = w(k)\frac{1}{N}\sum_{m=1}^{N} A(m;n)\cdot\exp\left(2\cdot\pi\cdot j\cdot\frac{(k-1+82)\cdot(m-1)}{N}\right),$$

$$\text{for } k=1,2,...,349$$

where $\delta(k;n)$, for k=1, 2, . . . , 349, are the error terms for the n-th AM data block.

To add overlap and subtract error from the AM signal, the pre-compensated AM samples for the n-th block are:

$$a(270\cdot n+k) = \begin{cases} a^{(0)}(270\cdot n+k)-\delta(k,n)-\delta(270+k,n), k=1,2,...,79 \\ a^{(0)}(270\cdot n+k)-\delta(k,n), k=80,81,...,270 \end{cases}$$

While the present invention has been described in terms of what are at present believed to be its preferred embodiments, it should be understood that various changes may be made without departing from the scope of the invention as defined by the claims.

What is claimed is:

1. A method for pre-compensating an analog signal in a composite digital audio broadcasting signal including the analog modulated carrier signal and a plurality of digitally modulated sub-carrier signals, the method comprising the steps of:

sampling the analog signal to obtain successive blocks of samples;

demodulating each of the blocks of samples to obtain a plurality of demodulator outputs;

remodulating the demodulator outputs that correspond to the predetermined ones of the digitally modulated sub-carrier signals to produce an error signal;

subtracting the error signal from one of the blocks of samples to produce a pre-compensated block of samples; and combining the pre-compensated block of samples with a plurality of OFDM pulses to produce a compensated composite signal.

2. The method of claim 1, wherein successive ones of the blocks of samples overlap each other.

3. The method of claim 1, wherein the number of samples in the pre-compensated block is equal to the number of samples in an OFDM symbol in the composite digital audio broadcasting signal.

4. The method of claim 1, further comprising the step of zeroing the demodulator outputs that correspond to complementary sub-carriers in the composite digital audio broadcasting signal.

5. The method of claim 1, further comprising the step of:
synchronizing the pre-compensated block of samples with the plurality of OFDM pulses.

6. An apparatus for pre-compensating an analog signal in a composite digital audio broadcasting signal including the analog signal and a plurality of digitally modulated sub-carrier signals, the apparatus comprising:
means for sampling the analog signal to obtain successive blocks of samples, p1 means for demodulating each of the blocks of samples to obtain a plurality of demodulator outputs;
means for remodulating the demodulator outputs that correspond to the predetermined ones of the digitally modulated sub-carrier signals to produce an error signal;
means for subtracting the error signal from one of the blocks of samples to produce a pre-compensated block of samples; and
means for combining the pre-compensated block of samples with a plurality of OFDM pulses to produce a compensated composite signal.

7. The apparatus of claim 6, wherein successive ones of the blocks of samples overlap each other.

8. The apparatus of claim 6, wherein the number of samples in the pre-compensated block is equal to the number of samples in an OFDM symbol in the composite digital audio broadcasting signal.

9. The apparatus of claim 6, further comprising; means for zeroing the demodulator outputs that correspond to complementary sub-carriers in the composite digital audio broadcasting signal.

10. The apparatus of claim 6, further comprising:
means for synchronizing the pre-compensated block of samples with the plurality of OFDM pulses.

11. An apparatus for pre-compensating an analog signal in a composite digital audio broadcasting signal including the analog signal and a plurality of digitally modulated sub-carrier signals, the apparatus comprising:
a sampler for sampling the analog signal to obtain successive blocks of samples,
a demodulator for demodulating each of the blocks of samples to obtain a plurality of demodulator outputs;
a modulator for remodulating the demodulator outputs that correspond to the predetermined ones of the digitally modulated sub-carrier signals to produce an error signal;
a first combiner for subtracting the error signal from one of the blocks of samples to produce a pre-compensated block of samples; and
a second combiner for combining the pre-compensated block of samples with a plurality of OFDM pulses to produce a compensated composite signal.

12. The apparatus of claim 11, wherein successive ones of the blocks of samples overlap each other.

13. The apparatus of claim 11, wherein the number of samples in the pre-compensated block is equal to the number of samples in an OFDM symbol in the composite digital audio broadcasting signal.

14. The apparatus of claim 11, further comprising;
means for zeroing the demodulator outputs that correspond to complementary sub-carriers in the composite digital audio broadcasting signal.

15. The apparatus of claim 11, further comprising:
means for synchronizing the pre-compensated block of samples with the plurality of OFDM pulses.

* * * * *

UNITED STATES PATENT AND TRADEMARK OFFICE
CERTIFICATE OF CORRECTION

PATENT NO. : 6,798,849 B2 Page 1 of 1
APPLICATION NO. : 10/012828
DATED : September 28, 2004
INVENTOR(S) : Kroeger et al.

It is certified that error appears in the above-identified patent and that said Letters Patent is hereby corrected as shown below:

Column 5, Line 42
"re modulation" should read -- re-modulation --

Column 7, Line 15
After "samples," delete "pl"

Column 7, Line 15
"means for demodulating each of..." should begin a new paragraph Signed and Sealed this Eighth Day of August, 2006

JON W. DUDAS
*Director of the United States Patent and Trademark Office*